United States Patent [19]

Effron

[11] 4,125,452

[45] Nov. 14, 1978

[54] INTEGRATED COAL LIQUEFACTION PROCESS

[75] Inventor: Edward Effron, Springfield, N.J.

[73] Assignee: Exxon Research & Engineering Co., Linden, N.J.

[21] Appl. No.: 805,366

[22] Filed: Jun. 10, 1977

[51] Int. Cl.² .......................... C10G 1/04; C10G 1/08; C10G 17/00
[52] U.S. Cl. ........................................ 208/8; 208/10; 208/263
[58] Field of Search .............................. 208/8, 10, 263

[56] References Cited

U.S. PATENT DOCUMENTS

| | | | |
|---|---|---|---|
| 2,989,458 | 6/1961 | Kulik | 208/8 |
| 3,523,886 | 8/1970 | Gorin et al. | 208/8 |
| 3,567,622 | 3/1971 | Waltrips | 208/8 |
| 3,583,900 | 6/1971 | Gatsis | 208/8 |
| 3,617,513 | 11/1971 | Wilson, Jr. | 208/8 |
| 3,715,301 | 2/1973 | Tassoney et al. | 208/8 |
| 4,012,314 | 3/1977 | Goldberger et al. | 208/8 |

*Primary Examiner*—Delbert E. Gantz
*Assistant Examiner*—Joan Thierstein
*Attorney, Agent, or Firm*—Wayne Hoover

[57] ABSTRACT

In a process for the liquefaction of coal in which coal liquids containing phenols and other oxygenated compounds are produced during the liquefaction step and later hydrogenated, oxygenated compounds are removed from at least part of the coal liquids in the naphtha and gas oil boiling range prior to the hydrogenation step and employed as a feed stream for the manufacture of a synthesis gas or for other purposes.

18 Claims, 1 Drawing Figure

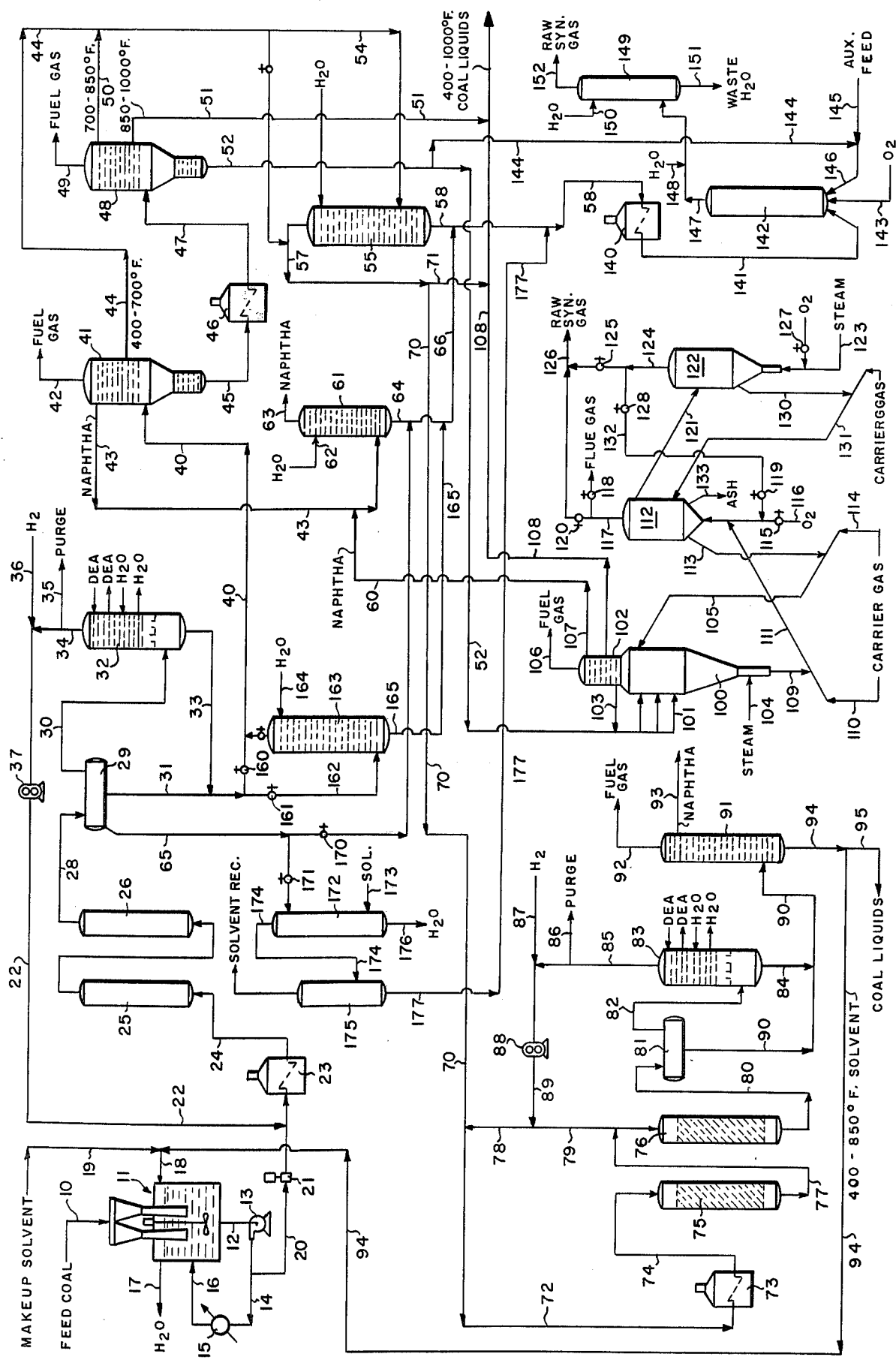

INTEGRATED COAL LIQUEFACTION PROCESS

The Government of the United States of America has rights in this invention pursuant to Contract No. E(49-18)-2353 awarded by the U.S. Energy Research and Development Administration.

BACKGROUND OF THE INVENTION

1. Field of the Invention

This invention relates to the manufacture of synthetic fuels from coal and similar carbonaceous solids and is particularly concerned with integrated coal liquefaction processes in which the coal liquids produced by liquefaction are subsequently hydrogenated.

2. Description of the Prior Art

Processes for the liquefaction of coal and similar carbonaceous solids normally require contacting of the solid feed material with a hydrocarbon solvent and molecular hydrogen at elevated temperature and pressure to break down the complex high molecular weight starting material into lower molecular weight hydrocarbon liquids and gases. The most promising processes of this type are those carried out with a hydrogen-donor solvent which gives up hydrogen atoms for reaction with organic radicals liberated from coal or other feed material during the liquefaction step. In such processes, the hydrogen-donor solvent is subsequently regenerated in a downstream solvent hydrogenation step. Plants for the carrying out of processes of this type normally include facilities for generation of the needed molecular hydrogen by the gasification of heavy liquefaction bottoms produced in the liquefaction step, by the coking of liquefaction bottoms and subsequent gasification of the resultant coke, by the reforming of light hydrocarbon liquids and gases produced in the process, or by other means.

The coal and other solid feedstocks employed in liquefaction operations normally include substantial quantities of oxygen which participates in the reactions taking place during liquefaction. This results in the formation of oxygenated organic compounds such as acids, phenols, cresols, dihydroxy-substituted benzenes, and the like. The specific compounds produced and the quantities in which they are present in the liquid and gaseous product streams depend in part upon the composition of the feed material and the liquefaction conditions employed. Some of these oxygenated compounds are normally concentrated in waste water formed by the cooling of liquid and vapor streams and must be removed from the waste water before it is reused or discharged. Other oxygenated compounds are carried over with the intermediate boiling range liquefaction products to the solvent hydrogenation zone where they are in part converted to the corresponding hydrocarbons during the solvent hydrogenation step. This results in the consumption of considerably more hydrogen than would otherwise be required for regeneration of the solvent and thus adds significantly to the cost of the overall process. Methods for the removal of residual oxygenated materials from the product streams further increase process costs.

SUMMARY OF THE INVENTION

The present invention provides an improved process for the liquefaction of coal and similar carbonaceous solids which alleviates the difficulties referred to above and permits the production of liquid and gaseous products at lower costs than might otherwise be incurred. In accordance with the invention, liquid product streams produced by the liquefaction of coal or similar carbonaceous solids in the presence of a hydrogen-donor solvent and molecular hydrogen are treated with water or an aqueous solvent for the extraction of oxygenated compounds prior to the hydrogenation of such streams and the oxygenated materials thus recovered, alone or with other feed materials, are employed for the generation of a hydrogen-containing gas or other purposes. Various system for generating hydrogen from the extracted oxygen-containing compounds can be used but it is normally preferred to feed the aqueous extract containing the oxygenated materials, along with liquefaction bottoms or an auxiliary feed stream, to a partial oxidation unit for conversion of the extracted compounds and feed material into a synthesis gas containing hydrogen and carbon monoxide as the principal constituents. The extracted material provides part of the feed for the partial oxidation unit and at the same time the water and oxygenated compounds in the aqueous extract supply steam and part of the oxygen needed for partial oxidation. As a result, the process makes possible the production of a fuel gas or hydrogen needed for liquefaction and solvent hydrogenation at relatively low cost. Alternatively, the aqueous extract containing oxygenated materials may be employed to supply steam and part of the feed materials to a catalytic reforming unit in which the feed stream is converted into a gas composed primarily of hydrogen and carbon monoxide. In either case, the raw gas produced will normally be treated for the removal of acid gas constituents and may be upgraded by shift conversion and methanation if desired.

The integrated process of the invention has numerous advantages over earlier coal liquefaction processes in that it reduces the quantity of hydrogen required for hydrogenation of the coal liquefaction solvent, permits the recovery and use in the process of materials which would otherwise require downstream refining of the liquid products and in some cases may result in the formation of waste materials and sludges, reduces the water treating facilities needed in connection with the process, makes available additional methane and other hydrocarbon gases for sale as products, and results in a reduction in the overall cost of the liquefaction process. Because of these and other advantages over earlier processes, the process of the invention has widespread potential application.

BRIEF DESCRIPTION OF THE DRAWING

The drawing is a simplified, schematic flow diagram of an integrated coal liquefaction process carried out in accordance with the invention.

DESCRIPTION OF THE PREFERRED EMBODIMENTS

In the process shown in the drawing, feed coal is introduced into the system through line 10 from a coal storage or feed preparation zone not depicted and discharged into a slurry drying unit 11 where a slurry of the feed solids in a hydrogen-donor solvent is prepared. The feed coal employed will normally consist of solid particles of bituminous coal, subbituminous coal, lignite or a mixture of two or more such feed materials having a particle size on the order of about ¼ inch or smaller along the major dimensions. It is generally preferred to employ coal which has been crushed and screened to a particle size of about 8 mesh or smaller on the U.S. Sieve Series Scale. The slurry drying unit will normally comprise an agitated drum in which the coal is suspended in hot hydrogen-donor solvent in a ratio of from about 0.8 to about 2 pounds of solvent per pound of dry coal. The temperature in the unit is maintained between about 250° and about 350° F. by recycling a portion of the slurry withdrawn through line 12 by means of slurry pump 13. The recycle stream passes through line 14 and heat exchanger 15 and is reintroduced into the slurry dryer drum through line 16. Moisture present in the feed coal is vaporized at the drum temperature and withdrawn through line 17. This vapor stream will normally include some solvent vaporized along with the water and hence it will generally be passed through heat transfer equipment not shown in the drawing to condense the solvent and permit its recovery. It is normally preferred to operate the slurry dryer so that the water content of the slurry is maintained at a level below about 2% by weight.

The coal-solvent slurry prepared in drum 11 includes a hydrogen-donor solvent introduced into the slurry drum through line 18. This solvent will normally be a coal-derived solvent, preferably a hydrogenated recycle solvent containing at least 20% by weight of compounds recognized as hydrogen-donors at temperatures between about 700° and about 900° F. or higher. Solvents which contain at least 50 weight percent of such compounds are preferred. Typical compounds of this type include indane, $C_{10}$–$C_{12}$ tetrahydronaphthalenes, $C_{12}$ and $C_{13}$ acenaphthenes, di-, tetra- and octahydroanthracenes, tetrahydroacenaphthenes, crysene, phenanthrene, pyrene, and other derivatives of partially saturated aromatic hydrocarbons. Such solvents have been described at length in the patent and technical literature. The solvent compositions resulting from the hydrogenation of recycle solvent fractions will depend in part upon the particular coal used as the feedstock to the process, the liquefaction conditions employed, and the conditions used in hydrogenating the solvent fractions selected from recycle following liquefaction. It is generally preferred that the solvent be mixed with the feed coal in a ratio of from about 1.0 to about 1.5 pounds of solvent per pound of dry coal. The solvent employed on initial startup of the process and any makeup solvent that might be required can be added to the system through line 19. The process produces an excess of liquid hydrocarbons within the solvent boiling range during normal operations and hence the addition of makeup solvent is generally not required once the system has reached equilibrium operating conditions.

As indicated above, only part of the coal-solvent slurry is recycled through line 14 to the slurry preparation drum. The remaining slurry is withdrawn through line 20 and passed through slurry pump 21 where the pressure is raised to the liquefaction level of about 1000 to about 3000 psig, preferably between about 1500 and about 2500 psig. High pressure treat gas composed primarily of hydrogen but also including lesser quantities of carbon monoxide, methane and the like is introduced into the slurry downstream of the pump through line 22 in an amount sufficient to supply from about 1 to about 8 weight percent, preferably from about 2 to about 5 weight percent, of hydrogen on a moisture-and-ash-free coal basis. The resulting slurry containing added molecular hydrogen is then passed into mixed phase preheat furnace 23 where it is heated to a temperature within the range between about 750° F. and about 950° F. or higher. In lieu of introducing the treat gas into the slurry upstream of furnace 23 as shown, the treat gas can be separately preheated in a furnace not depicted in the drawing and thereafter mixed downstream of furnace 23 with the hot coal-hydrogen-donor solvent slurry.

The liquefaction step of the process is carried out in one or more liquefaction reactors downstream of the preheat furnace. Although two upflow type reactors 25 and 26 are shown in the drawing, reactors of other types may be employed. In some cases it may be preferable to use a single reactor or provide three or more reactors. Reactors arranged in parallel instead of in series as shown can in some cases also be used. The hot slurry containing suspended coal particles, hydrogen-donor solvent and molecular hydrogen is introduced through line 24 into reactor 25. The temperatures within the reactors are maintained between about 750° and about 950° F., preferably between about 800° and about 875° F. Pressures between about 1000 and about 3000 psig, preferably between about 1500 and about 2500 psig, are normally employed. The liquid residence time within the two reactors will normally range between about 5 minutes and about 100 minutes, preferably between about 10 and about 60 minutes. Under these conditions, high molecular weight constituents of the feed coal are broken down and hydrogenated to form lower molecular weight gases, vapor and liquid products. The liquid products will include heavy constituents having nominal boiling points in excess of about 1000° F. at atmospheric pressure.

The hydrogen-donor solvent employed in the process contributes hydrogen atoms which react with organic radicals liberated from the coal and prevent their recombination. Hydrogen in the treat gas injected into the slurry serves as replacement hydrogen for depleted hydrogen-donor molecules in the solvent and results in the formation of additional hydrogen-donor molecules by in situ hydrogenation. Some direct hydrogenation of coal radicals by hydrogen in the treat gas may also take place. The process conditions within the liquefaction zone are selected to insure the generation of sufficient hydrogen-donor precursors and at the same time provide sufficient liquid product for proper operation of the solvent hydrogenation zone downstream of the liquefaction step and may be varied as necessary to keep the process in material and energy balance.

Following liquefaction of the coal as described above, the liquefaction reactor product stream is withdrawn from reactor 26 through line 28. This stream will normally include gaseous products such as carbon monoxide, carbon dioxide, ammonia, hydrogen, hydrogen chloride, hydrogen sulfide, methane, ethane, ethylene, propane, propylene, and the like. It will also include solvent, coal liquids ranging from naphtha boiling range materials through heavy liquefaction products boiling in excess of about 1000° F., entrained solids including unreacted coal and ash residues, and oxygenated compounds such as propanal, acetone, acetic acid, methyl ethyl ketone, propanoic acid, n-butyric acid, isobutyric acid, pentanoic acid, phenol, ortho-cresol, meta-cresol, xylenol, other alkyl phenols, resorcinol, pyrocatechol, methyl pyrocatechol, and the like. The concentrations in which the oxygenated materials are present will depend upon the feed coal used, the amount of moisture present, the liquefaction conditions employed, and other factors.

The effluent stream withdrawn from reactor 26 through line 28 in passed into liquefaction reactor effluent separator 29 where it is separated into an overhead vapor stream withdrawn through line 30 and a liquid stream taken off through line 31. Although only a single separator is shown, two or more separators designed to afford more effective separation than can be obtained in a single stage will normally be used. Heat exchange equipment not shown in the drawing will generally be included to permit the condensation of liquids and the recovery of heat for the generation of steam to be used elsewhere in the system. The vapor stream withdrawn from separator 29 through line 30, after passage through heat recovery equipment not shown, is introduced into scrubbing unit 32 where the vapors are contacted with water and with an absorbent or solvent such as diethanolamine for the removal of hydrogen sulfide, carbon dioxide and other acid gas constituents in the conventional manner. Hydrocarbons condensed from the vapor stream are recovered as condensate through line 33 and added to the liquid stream in line 31. Gases are taken overhead through line 34. A portion of the gas stream will normally be purged through line 35 to prevent the buildup in the system of carbon monoxide, light hydrocarbons and other materials in excessive quantities. Makeup hydrogen is introduced into the gas stream through line 36, the gases are compressed sufficiently in compressor 37 to permit their recycle, and the high pressure stream is then passed through line 22 into the slurry being fed to preheat furnace 23. It should be understood that the process of the invention is not restricted to the particular gas treating system shown and that other procedures including the use of multiple scrubbers or other equipment and solvents other than or in addition to diethanolamine can be employed if desired.

The liquids separated from the liquefaction reactor effluent and withdrawn from separator 29 through line 31 are passed through pressure letdown valves and heat transfer equipment not shown in the drawing and are then fed through line 40 into atmospheric fractionator 41. Here the liquid stream is fractionated to produce an overhead stream composed primarily of hydrocarbon gases which is recovered through line 42, a light naphtha stream boiling up to about 400° F. which is taken off through line 43, an intermediate stream boiling between about 400° and about 700° F. which is withdrawn through line 44 and a heavier fraction which is withdrawn through line 45. Pumparound equipment, heat exchangers and other auxiliaries associated with the atmospheric fractionator are not shown. The overhead gases recovered can be employed as a fuel gas or used for other purposes. The naphtha stream and the intermediate boiling stream in line 44 will normally be treated for the recovery of oxygenated materials as described below. The heavier fraction withdrawn through line 45 is passed through vacuum fractionator preheater 46 and then introduced through line 47 into vacuum fractionator 48.

The liquids fed to the vacuum fractionator are further distilled under reduced pressure to produce an overhead fuel gas stream which is taken off through line 49, an intermediate stream boiling between about 700° and 850° F. which is passed through line 50 and combined with the 400° to 700° F. fraction from the atmospheric fractionator in line 44, a somewhat heavier fraction boiling between about 850° and about 1000° F. which is withdrawn through line 51, and a heavy bottoms fraction composed primarily of constituents nominally boiling in excess of about 1000° F. which is recovered through line 52. This heavy fraction is referred to as the liquefaction bottoms and in the process shown will generally include suspended particles of unreacted coal, char, and ash residues. In other processes employing gravity separation, centrifugation or the like for the removal of such solids, these suspended particles may be present in somewhat lower concentrations. The liquefaction bottoms may constitute as much as 50% of the total effluent from the liquefaction stage of the process. Again it should be noted that pumparound equipment, heat exchangers and other auxiliaries associated with the vacuum fractionator are not shown in the drawing. It should also be noted that the invention is not restricted to recovery of the particular side streams depicted in connection with the atmospheric and vacuum fractionators and that other streams of somewhat different boiling ranges may be recovered if desired.

The stream produced by combining the nominal 400° to 700° F. fraction from the atmospheric fractionator in line 44 and the nominal 700° to 800° F. fraction from the vacuum fractionator in line 50 is passed through line 54 to a liquid-liquid extraction column 55. Here the coal liquids are contacted with water, a dilute caustic solution, or other solvent at a temperature in the range between about 100° and about 500° F. and at a pressure sufficiently high to maintain the water and oil in the liquid phase, generally between about 100 and about 750 psia. Under these conditions, phenolic compounds and other oxygenated materials contained in the coal liquids are extracted by the water to produce an aqueous extract phase containing from about 2 to about 10 weight percent oxygenated compounds and some hydrocarbon constituents. The amount of hydrocarbons present will depend in part upon the composition of the feed coal to the process, the liquefaction conditions employed, and the boiling range of the coal liquids fed to the extraction step but in general the hydrocarbons may constitute up to about 20 weight percent of the total extracted material. Coal liquids from which the oxygenated materials have been extracted are taken overhead from column 55 through line 57 and the aqueous extract containing phenols and other oxygenated compounds and extracted hydrocarbons is withdrawn as an underflow stream through line 58. Hydrocarbon compounds which may be present in the underflow stream include, for example, tetralin, naphthalene, methyl naphthalene, alkyl benzenes, alkyl naphthalenes, acenaphthene, decalin, alkyl acenaphthenes, fluorene, phenanthrene and the like. It will be understood that the extraction step of the process is not restricted to the use of a single column as shown in the drawing and that other liquid-liquid extraction systems may be employed if desired.

The naphtha stream withdrawn from atmospheric fractionator 41 through line 43 may be treated for the removal of oxygenated compounds in a manner similar to that used for the removal of oxygenated materials from the higher boiling atmospheric and vacuum fractionator streams. This can be done by passing the naphtha from line 43, together with additional coker naphtha from line 60 as described below, into liquid-liquid extraction unit 61 where the upflowing naphtha is countercurrently contacted with hot water introduced through line 62. It is generally preferred to operate the extraction unit at a temperature between about 100° and about 500° F. and at a pressure sufficient to maintain the naphtha and water in liquid phase, normally from about 100 to about 750 psia. The optimum conditions will again depend upon the constituents present in the naphtha stream and can be readily determined.

The naphtha from which phenolic compounds and other oxygenated materials have been removed is taken overhead from the extraction unit through line 63 and can thereafter be further processed and used as a gasoline blending stock or the like. The aqueous phase containing oxygenated compounds extracted from the naphtha is withdrawn from the extraction unit through line 64 and if desired can be combined with some or all of the waste water withdrawn from separator 29 through line 65 and from elsewhere in the process. This waste water will normally contain oxygenated compounds removed from the liquefaction products and will also include some hydrocarbons present as a result of the incomplete separation of hydrocarbons and aqueous streams. The combined aqueous stream can then be passed through line 66 and combined with the extract phase from unit 55 in line 58. A typical wastewater stream produced by the hydrogen-donor solvent liquefaction of coal may include the compounds shown in Table I in a total concentration of about 2.7 weight percent.

TABLE I
ORGANIC CONSTITUENTS
IN COAL LIQUEFACTION WASTEWATER

| Organic Components [1] | Concentration (wppm) | |
|---|---|---|
| | Average [2] | Range |
| Propanal | 230 | 137–349 |
| Acetone | 770 | 590–1070 |
| Acetic Acid | 7130 | 5049–10019 |
| MEK | 160 | 114–221 |
| Propanoic Acid | 2790 | 1970–3737 |
| Isobutyric Acid | 300 | 230–412 |
| N-butyric Acid | 840 | 576–1141 |
| Valeric Acid | 420 | 233–663 |
| Phenol | 2130 | 1638–2390 |
| O-Cresol | 135 | 93–216 |
| P/M-Cresol | 1320 | 944–1579 |
| $C_2+$ Phenols | 1310 | 696–1977 |
| Resorcinol | 3830 | 2674–4366 |
| Others [3] | 5600 | 3905–7006 |
| Total Organics [4] | 26900 | 22775–34056 |

[1] Analyses were done on filtered samples.
[2] Average of four analyses.
[3] Remaining organic components are predominately dihydroxy-substituted benzenes.
[4] Average of four analyses for total organics, not the sum of averages of individual components.

The treated oil withdrawn as raffinate from extraction unit 55 through line 57 will normally be split, an amount sufficient to produce the recycle solvent required for liquefaction being passed through line 70 to the solvent hydrogenation unit and the remainder being fed through line 71 for ultimate withdrawal with other streams as 400° to 1000° F. coal liquids product. The relative amounts of oil sent to solvent hydrogenation and product withdrawal will depend in part upon the quantity of liquids, if any, withdrawn as product at other points in the system. One of the advantages of the process is that it is relatively flexible and permits the recovery of product streams at a number of different points.

The nominal 400° to 850° F. solvent boiling range material passed through line 70 is fed through line 72 to the solvent hydrogenation preheat furnace 73. Here the liquids are heated to the solvent hydrogenation temperature and then passed through line 74 to the first of a series of solvent hydrogenation reactors 75 and 76. These two reactors are interconnected by line 77 which may include one or more heat transfer units not shown in the drawing. The solvent hydrogenation reaction is an exothermic reaction and hence cooling or quenching is normally required to avoid excessive reaction temperatures, particularly in the second stage. Either liquid or gas quenching may be employed. Although two downflow fixed bed hydrogenation reactors are shown in the drawing, it will be understood that the process is not restricted to this particular hydrogenation reactor configuration and that in some cases a single stage unit or more than two stages may be preferable.

The solvent hydrogenation unit will normally be operated at a pressure and temperature somewhat below those employed in the liquefaction unit. The temperature, pressure and space velocity employed for solvent hydrogenation will depend to some extent upon the character of the feed stream to the unit, the catalyst employed, and other factors. In general, however, temperatures within the range between about 550° F. and about 850° F., pressures between about 800 psig and about 3000 psig, and space velocities within the range between about 0.3 and about 3 pounds of feed/hour/pound of catalyst are preferred. Hydrogen treat rates sufficient to give partial pressures in the reactor within the range between about 500 and about 2000 psig will ordinarily be employed. The hydrogen required is introduced into the first stage by passing it through line 78 into the feed stream in line 70 upstream of the preheat furnace. Additional hydrogen-containing gas for the second stage of the hydrogenation unit is supplied through line 79 upstream of the second stage and serves in part to quench the reaction in the second stage.

It is normally advantageous to maintain a mean hydrogenation temperature in the solvent hydrogenation zone between about 625° F. and about 750° F., a pressure between about 1500 and about 2500 psig, a liquid hourly space velocity between about 0.5 and about 2.5 pounds of feed/hour/pound of catalyst, and a hydrogen treat rate sufficient to give a hydrogen partial pressure within the range between about 900 and about 1600 psig.

The catalyst employed in the solvent hydrogenation zone may be any of a variety of conventional hydrotreating catalysts. Such catalysts typically include an alumina or silica-alumina support carrying one or more iron group metals and one or more metals from Group VI-B of the Periodic Table in the form of an oxide or sulfide. Combinations of two or more Group VI-B metal oxides or sulfides are generally preferred. Representative metal combinations which may be employed in such catalysts include oxides and sulfides of cobalt-molybdenum, nickel-molybdenum-tungsten, cobalt-nickel-molybdenum, nickel-molybdenum, and the like. A suitable catalyst, for example, may be a high metal content sulfided cobalt-molybdenum-alumina catalyst containing from 1 to 10 weight percent of cobalt oxide and about 5 to 40 weight percent of molybdenum oxide, preferably from 2 to 5 weight percent of the cobalt oxide and from about 10 to 30 weight percent of the molybdenum oxide. Other metal oxides and sulfides in addition to those specifically referred to above, particularly the oxides of iron, nickel, chromium, tungsten and the like, can also be used. Numerous commercial hydrogenation catalysts suitable for use in the process of the invention are available from various catalyst manufacturers and will be familiar to those skilled in the art.

The reaction taking place in the solvent hydrogenation zone serves primarily to regenerate the hydrogen-donor solvent used for liquefaction purposes. The hydrogenated effluent is withdrawn from the second stage 76 of the solvent hydrogenation zone through line 80, passed through heat exchange equipment not shown in the drawing, and introduced into liquid-gas separator 81. A vapor stream withdrawn from the separator through line 82 is introduced into scrubbing unit 83 where the vapor is contacted with water and a solvent or absorbent such as diethanolamine for the removal of hydrogen sulfide, ammonia, carbon dioxide and other acid gases. Hydrocarbons condensed in the scrubbing unit are withdrawn as condensate through line 84. The gases are taken overhead through line 85 and a portion of the gas stream is purged by means of line 86 to prevent the buildup of undesirable constituents within the system. The remaining gases are combined with makeup hydrogen introduced through line 87, raised to solvent hydrogenation pressure in compressor 88, and then recycled to the solvent hydrogenation zone through lines 89 and 79. Again it will be understood that the process is not restricted to the particular procedure shown for treatment of the gases and that other procedures and different solvents may be employed if desired.

The liquid portion of the solvent hydrogenation zone effluent is withdrawn from separator 81 through line 90 and, after suitable heat exchange in equipment not shown in the drawing, is introduced along with the condensate from line 84 into solvent hydrogenation fractionator 91. Here the liquids are fractionated to produce an overhead stream taken off through line 92, a naphtha stream recovered through line 93, and a bottoms stream withdrawn through line 94. The overhead gases will be composed for the most part of hydrocarbon gases and can be employed as a fuel. The naphtha constitutes an additional product of the process and can be employed as a gasoline blending stock or used for other purposes. The high boiling material withdrawn through line 94 is a regenerated hydrogen-donor solvent stream having a nominal boiling range between about 400° and about 850° F. This stream is passed through line 94 and line 18 to slurry dryer 11 where it is employed for preparation of the coal-donor solvent slurry fed to the liquefaction unit. If desired, a portion of this stream may in some cases be withdrawn as product through line 95.

The hot liquefaction bottoms withdrawn from the vacuum fractionator through line 52 is normally, but not necessarily, fed to a fluidized bed coking unit 100 through multiple feed lines 101. Alternatively, if partial oxidation is employed to produce hydrogen or a synthesis gas for fuel, the liquefaction bottoms can be fed directly to the partial oxidation unit. The coking unit in the system shown will normally be provided with an upper scrubbing and fractionation section 102 from which liquid and gaseous products produced as a result of the coking reaction can be withdrawn. The unit will generally also include one or more internal cyclone separators or similar devices not shown in the drawing which serve to remove entrained particles from the upflowing gases and vapors entering the scrubbing and fractionation section and return them to the fluidized bed below. The feed to the coking unit may be blended with heavy recycle coker liquids withdrawn from the scrubbing section through line 103 if desired. In some cases, gasifier fines produced in the process and finely divided feed coal can also be added to the liquefaction bottoms and fed to the coking unit.

The fluidized coking unit employed in the process contains a bed of coke particles which are maintained in the fluidized state by means of steam or other fluidizing gas introduced near the bottom of the unit through line 104. This fluidized bed is normally maintained at a temperature between about 900° F. and about 1600° F. by means of hot char which is introduced into the upper part of the reaction section of the coker through line 105. The pressure within the reaction zone will generally range between about 10 and about 30 pounds per square inch gauge, but higher pressures can be employed if desired. The optimum conditions in the reaction zone will depend in part upon the characteristics of the particular feed material employed and can readily be determined.

The hot liquefaction bottoms stream is fed into the reaction zone of the coking unit through feed lines 101 and sprayed onto the surfaces of the coke particles in the fluidized bed. Here the feed material is rapidly heated to bed temperatures. As the temperature of the bottoms increases, lower boiling constituents are vaporized and the heavier portions undergo thermal cracking and other reactions to form lighter products and additional coke on the surfaces of the bed particles. Vaporized products, unreacted steam and entrained solids move upwardly through the fluidized bed and enter the cyclone separators or similar devices where solids in the fluids are rejected. The fluids then move into the scrubbing and fractionation section of the unit where refluxing takes place. An overhead gas stream is withdrawn from the coker through line 106 and may be employed as a fuel gas or the like. A naphtha side stream is withdrawn through line 107 and passed through line 60 for combination with the naphtha fed through line 43 to the naphtha extraction unit as described earlier. A heavier liquids fraction having a nominal boiling range between about 400° and about 1000° F. is withdrawn as a side stream through line 108. This side stream may be combined with raffinate oil from line 71 and nominal 850° to 1000° F. boiling point material from the vacuum fractionator in line 51 and withdrawn from the system as a 400° to 1000° F. coal liquids product stream. The heavy bottoms from the coker scrubbing unit boiling above about 1000° F. can be recycled to the incoming feed as described earlier.

As the coking reaction takes place within the reactor section of the coker and additional coke is deposited, the coke particles in the fluidized bed increase in size. These particles thus gradually move downwardly through the fluidized bed and are eventually discharged from the reaction section through line 109 as a dense phase solids stream. This stream is picked up by steam or other carrier gas introduced through line 110 and transported upwardly through line 111 into fluidized bed heater 112. Here the coke particles in the fluidized bed are heated to a temperature of from about 50° to about 300° F. above that in the reaction section of the coker. Hot solids are withdrawn from the bed of heater 112 through standpipe 113, picked up by steam or other carrier gas introduced through line 114, and returned to the reaction section of the coker through line 105. The circulation rate between the coker and the heater is thus maintained sufficiently high to provide the heat necessary to keep the coker at the required temperature. The solids within the heater can be either heated directly by the introduction of air or oxygen or by the passage of hot gases from the gasifier associated with the unit as described below.

If the solids in heater 112 are to be heated by the direct injection of air or oxygen-containing gas, valve 115 in line 116 will be opened and the air or oxygen-containing gas will be passed upwardly into the lower end of the heater. Flue gases taken overhead from the heater through line 117 will be passed through valve 118 and sent to downstream treating facilities not shown in the drawing for the removal of solids and contaminants prior to the discharge of the gases into the atmosphere or their use for other purposes. In this mode of operation, valves 119 and 120 are normally closed.

The coking unit shown in the drawing has associated with it a fluidized bed gasifier in which coke particles produced during the coking operation are gasified for the production of a gas useful as a fuel or synthesis gas. Hot carbonaceous particles are continuously circulated from the fluidized bed in heater 112 through line 121 into the fluidized bed gasifier 122. Here the particles are contacted with steam introduced into the lower end of the gasifier through line 123. The steam reacts with carbon in the particles to produce a gas containing hydrogen, carbon monoxide, carbon dioxide, and some methane. This gas is taken overhead from the gasifier through line 124, passed through valve 125 and discharged through line 126 to downstream processing equipment where contaminants are removed from the gas and the gas can if desired be shifted over a shift catalyst to increase the ratio of hydrogen to carbon monoxide. Acid gases will normally be removed from the gas stream and the residual carbon monoxide can if desired be catalytically methanated to produce a high purity hydrogen stream suitable for use in a variety of processing operations. Conventional shift, acid gas removal, and methanation procedures can be employed. In this mode of operation, valves 127 and 128 are normally closed.

A stream of hot carbonaceous solids is continuously withdrawn from gasifier 122 through standpipe 130 and returned to heater 112 through line 131. The solids circulation rate between the heater and gasifier is adjusted to maintain a gasifier temperature within the range between about 1200° and about 1800° F. The gasifier will normally be operated at a pressure between about 10 and about 2000 psig. The gasification conditions selected will depend in part upon whether a gasification catalyst is employed. It has been shown that alkali metal compounds and, under certain conditions, alkaline earth metal compounds can be employed to catalyze the gasification of coke and char and thus make possible higher gasification rates than might otherwise be obtained. The use of such catalysts is described elsewhere in the patent literature and will therefore be familiar to those skilled in the art.

In lieu of introducing air or an oxygen-containing gas into the fluidized bed heater through line 116 as described above, hot gases taken overhead from the gasifier through line 132 containing valve 128 and valve 119 can be introduced into the lower end of the heater to provide the heat required. The hot gases thus circulated from the gasifier to the heater transfer heat to the solid particles within the fluidized bed and maintain them at the required temperature level. In this mode of operation, valves 115 and 125 will normally be closed. The gas taken overhead from the heater in this case will include the gasification products. This gas stream, assuming that oxygen rather than air is injected into the lower end of the gasifier with the steam used for gasification purposes, will consist primarily of hydrogen, carbon monoxide, carbon dioxide and some methane. The gas is taken overhead from the heater through line 117, valve 120 and line 126 for downstream upgrading to produce a fuel gas or nitrogen stream. If desired, the downstream processing may include shifting of the gas, the removal of acid gases, methanation, steam reforming and other processing steps. Ash may be withdrawn from the system through line 133.

The system shown in the drawing includes a gasification zone 142 which will preferably be a partial oxidation unit for the production of a synthesis gas that can be upgraded into either a fuel gas or a high purity hydrogen stream. The water containing extracted phenols and other oxygenated compounds from the naphtha and gas oil boiling range coal liquids and some hydrocarbons is passed through line 58 and heat exchange equipment not shown in the drawing to furnace 140 where the oxygenated materials and hydrocarbons are vaporized and the water is converted into steam. As pointed out earlier, the water from the extraction unit will normally contain up to about 10% by weight of oxygenated compounds and may include hydrocarbons in a concentration up to about 20% of the phenols and other oxygenated materials present. The optimum conditions will depend in part upon the conditions at which the partial oxidation unit is to be operated and whether it is desired to produce hydrogen or a fuel gas. The effluent withdrawn from the furnace is passed through line 141 into partial oxidation unit 142. Oxygen or air is introduced into the partial oxidation unit through line 143 and liquefaction bottoms withdrawn from line 52 through line 144 or an auxiliary fuel such as a petroleum residuum supplied through line 145 is injected into the partial oxidation unit through line 146. In lieu of using a furnace for generation of the high pressure steam to the partial oxidation unit as shown, the steam can be generated by heat exchange within the partial oxidation unit as is done in some commercial plants.

The steam rate to the partial oxidation unit will normally range between 0.1 and about 1.0 pound per pound of ash-free feed to the unit. Rates between about 0.3 and about 0.5 pound per pound are generally preferred. The oxygenated compounds and hydrocarbons contained in the water from the extraction units which is used to generate the steam should be considered a part of the feed and taken into account in determining the ratio of steam to liquefaction bottoms or auxiliary feed material. The oxygen feed rate to the oxidation unit will generally range between about 0.5 and about 2.0 pounds per pound of ash-free feed, preferably between about 0.7 and about 1.3 pounds per pound. The oxygen present in the oxygenated compounds participates in the partial oxidation reaction and thus reduces the amount of oxygen which must be supplied to the unit through line 143 from an oxygen plant not shown in the drawing. The oxidation unit will normally be operated at a temperature between about 2000° and about 3000° F. and at a pressure between about 300 and about 1500 psig. Operating temperatures in the range between about 2400° and about 2800° F. and pressures between about 500 and about 1300 psig are generally preferred.

Within the partial oxidation unit, the oxygen and steam react with the liquefaction bottoms or other feed material and with the oxygenated compounds and hydrocarbons from the extract solution to produce a synthesis gas composed primarily of hydrogen and carbon monoxide. A typical gas produced in this manner may contain, for example, about 29.90 mole percent hydrogen, 0.43 mole percent nitrogen, 10.08 mole percent water, 53.33 mole percent carbon monoxide, 7.15 mole percent carbon dioxide, 0.61 mole percent hydrogen sulfide, and 0.50 mole percent methane. The hot gas leaving the oxidation reactor through line 147 will also include unreacted carbon or soot and ash. This hot gas may be cooled by means of a direct water quench introduced through line 148. The gas is then introduced into a water scrubber 149 where it is contacted with water supplied through line 150 to remove the unreacted carbon and ash. Carbon and ash taken out of the gas are contained in a slurry withdrawn from the scrubber through line 151. This slurry is passed to a carbon recovery system not shown in the drawing where the carbon is recovered for recycle with the feed stream to the partial oxidation reactor and the ash is slurried with water for disposal.

The synthesis gas saturated with water leaves the scrubber through line 152 and will normally be fed to a water-gas shift reactor where most of the carbon monoxide reacts with water to form hydrogen and carbon dioxide via the water-gas shift reaction. In such a system, the steam required for the shift reaction is produced by the direct water quench of the synthesis gas. The shift reaction may be carried out in two stages, using a high temperature shift reactor as the initial stage and a low temperature shift reactor containing a sulfur tolerant catalyst as the second stage to permit shift conversion without prior removal of the hydrogen sulfide. Thereafter, the carbon dioxide and hydrogen sulfide can be removed in a conventional acid gas removal system, traces of $H_2S$ can be taken out by reaction in a bed of zinc oxide, and final purification of the hydrogen can be achieved by converting any remaining carbon oxides to methane via the methanation reaction. Conventional systems can be used for the water-gas shift and subsequent processing steps and hence these steps are not shown in the drawing. The resulting gas will be a high purity hydrogen stream and may typically contain about 95.03 mole percent hydrogen, 0.58 mole percent nitrogen, 0.15 mole percent water, and 4.24 mole percent methane. This gas is suitable for use as makeup hydrogen in the liquefaction and solvent hydrogenation steps of the process and can also be used in other industrial applications requiring a high purity hydrogen stream.

In lieu of producing hydrogen as described above, the hot synthesis gas withdrawn from the partial oxidation unit through line 147 can be cooled in a waste heat boiler to generate steam, passed through a water scrubber for the removal of carbon and ash, and after further cooling treated for the removal of hydrogen and carbon dioxide in a diethanolamine scrubber or the like. The treated gas recovered from the diethanolamine scrubber will typically contain about 36.24 mole percent hydrogen, 0.52 mole percent nitrogen, 0.22 mole percent water, 62.21 mole percent carbon monoxide, and a 0.67 mole percent methane. This gas will have a net heating value of about 304 Btu's per standard cubic foot and can be employed as an intermediate Btu fuel gas for the generation of process steam, used directly as a fuel gas in process furnaces, or employed for other purposes.

The partial oxidation step of the process has been described above in terms of the use of oxygen of relatively high purity produced in an oxygen plant associated with the process. It will be understood, however, that the partial oxidation step can also be carried out with air in lieu of molecular oxygen if desired. This results in the production of a raw gas stream with a relatively high nitrogen content and will ultimately lead to a low Btu fuel gas in place of the intermediate Btu gas referred to above. In some instances, however, the lower investment due to elimination of the oxygen plant may make the production of such a low Btu fuel gas preferable.

As pointed out earlier, the process of the invention is not limited to the use of partial oxidation as a means for the generation of hydrogen from oxygenated compounds extracted from the coal liquids. The partial oxidation unit depicted in the drawing can be replaced by a catalytic steam reforming unit fed with methane, naphtha and similar low boiling hydrocarbons produced in the process. In this case, the oxygenated compounds and hydrocarbons extracted from the coal liquids will be vaporized as the water in the extract solution is converted to steam in furnace 140. This steam and the accompanying vaporized compounds can then be fed with the naphtha or other feed material to the catalytic steam reforming unit and reacted to produce a synthesis gas containing hydrogen and carbon monoxide as the principal constituents. The catalytic reforming unit may be of conventional design and employ any of a variety of commercially available iron, nickel or similar reforming catalysts. The raw product gas generated by reforming can then be upgraded into either a fuel gas or a high purity hydrogen stream by methods similar to those described above.

There are various other modifications which can be made to the process described above if desired. Although it is generally preferred to extract oxygenated compounds in extraction unit 55 downstream of the atmospheric fractionator 41 as described earlier, it may be advantageous in some cases to carry out this extraction step on the feed to the atmospheric pipestill. This can be done, for example, by closing valve 160 in line 40 and passing the liquids from lines 31 and 33 through valve 161 and line 162 to extraction unit 163. Here the liquids can be contacted with water, a caustic solution or the like introduced through line 164 for removal of the oxygenated materials. The extract phase containing these materials can be passed through line 165 for combination with other aqueous streams containing extracted oxygenated compounds. Depending upon the coal feed employed in the process, this extraction of oxygenated compounds prior to fractionation may result in more effective extraction because of greater density differences between the hydrocarbon and aqueous phases. It results in heat efficiency debits, however, and hence may not be the most economical mode of operation.

A further modification which may be advantageous under some circumstances involves the extraction of phenols and other oxygenated compounds from wastewater streams with an organic solvent in order to concentrate the oxygenated materials. The wastewater stream in line 65, for example, can be treated in this manner by closing valve 170 and opening valve 171 so that the wastewater passes into extraction column 172. Here the aqueous stream is contacted with butylacetate or a similar solvent in which the oxygenated compounds are preferentially soluble. The solvent, introduced through line 173, extracts phenols and the like from the water and is then passed through line 174 to column 175 where the solvent is removed by distillation, steam stripping or the like. The water from which the oxygenated compounds have been extracted is discharged from column 172 through line 176 and passed to a water treatment plant for the removal of contaminants prior to reuse or discharge. The concentrated extract containing the phenols and other oxygenated materials is withdrawn from column 175 through line 177 and may be combined with other streams containing such materials and ultimately used for the production of a synthesis gas or hydrogen. If desired, a similar procedure can also be employed to extract oxygenated compounds from the aqueous stream recovered from column 55. Commercially available processes employing organic solvents such as butylacetate and the like can be used for this purpose. This concentration of the oxygenated materials prior to their introduction into the partial oxidation unit gives more flexibility in the operation of that unit and may therefore be advantageous.

Still other modifications of the process of the invention may be employed. In lieu of passing the liquefaction bottoms from vacuum fractionator 48 through line 52 to coking unit 100 as shown, for example, this stream may be passed in its entirety through line 144 to the partial oxidation unit 142 or to an alternate type of gasifier for the production of synthesis gas or hydrogen. The oxygenated compounds recovered from the hydrocarbons or wastewater can in some cases be introduced into gasifier 122 instead of into the partial oxidation zone. The coker bottoms in line 103 can if desired also be fed to the partial oxidation zone. These and other modifications will suggest themselves to those skilled in the art.

Although the process of the invention has been described above primarily in terms of the gasification of oxygenated compounds extracted from the liquefaction effluent prior to solvent hydrogenation, it has been pointed out earlier that the oxygenated materials can be employed for other purposes if desired. These materials can, for example, be recovered from the aqueous solution in line 58 by distillation or extraction with a solvent such as that employed in recovery unit 172 and employed as chemical intermediates or marketed as phenols and the like. The materials in line 177 can be employed for similar purposes. The removal of these oxygenated compounds prior to solvent hydrogenation permits significant reductions in the amount of hydrogen needed in the hydrogenation step of the liquefaction process and has other economic benefits.

It will be apparent from the foregoing that the process of the invention has significant advantages over earlier integrated liquefaction processes in that it reduces the quantity of hydrogen which must be supplied for hydrogenation of the coal liquids produced by liquefaction, permits the recovery and use in the process of oxygenated compounds and hydrocarbons which would otherwise have to be separated from the liquid products in downstream refining units, provides a relatively inexpensive system for the generation of a high purity hydrogen stream or fuel gas which may be employed in the liquefaction operation or used for other purposes, reduces the quantity of waste water which must be handled and treated for the removal of contaminants, decreases the amount of oxygen which must be supplied for the generation of synthesis gas by partial oxidation, and has other advantages over integrated liquefaction processes proposed heretofore.

I claim:

1. In a process wherein coal or similar carbonaceous solids containing combined oxygen are liquefied at elevated temperature and pressure in a liquefaction zone in the presence of a hydrocarbon solvent to produce coal liquids and at least part of said coal liquids are thereafter hydrogenated in a catalytic hydrogenation zone, the improvement which comprises recovering coal liquids from said liquefaction zone, extracting at least part of the recovered coal liquids with an aqueous solvent in which oxygenated compounds formed during liquefaction are soluble to produce a hydrocarbon raffinate phase and an aqueous extract phase containing said oxygenated compounds, hydrogenating at least part of said raffinate phase in said hydrogenation zone, and gasifying said oxygenated compounds contained in said extract phase to produce a synthesis gas containing hydrogen and carbon monoxide.

2. A process as defined by claim 1 wherein said oxygenated compounds are gasified by reacting said compounds with steam and oxygen in a partial oxidation zone.

3. A process as defined by claim 1 wherein said oxygenated compounds are gasified by reacting said compounds with steam in a catalytic steam reforming zone.

4. A process as defined by claim 1 wherein said oxygenated compounds are combined with a hydrocarbon feed and gasified.

5. A process as defined by claim 1 wherein said aqueous extract phase is vaporized to produce steam containing said oxygenated compounds and said steam containing said compounds is fed with a hydrocarbon feed stream and added oxygen to a partial oxidation zone.

6. A process as defined by claim 1 wherein said aqueous extract phase is combined with wastewater containing oxygenated compounds and the combined stream is thereafter vaporized and fed to a partial oxidation zone.

7. A process as defined by claim 1 wherein naphtha boiling range hydrocarbons produced during liquefaction are separately extracted with water to produce an aqueous stream containing oxygenated materials removed from said naphtha boiling range hydrocarbons, said aqueous stream is combined with said aqueous extract phase, and oxygenated compounds contained in the combined stream are gasified to produce a synthesis gas containing hydrogen and carbon monoxide.

8. A process as defined by claim 1 wherein said aqueous extract phase contains from about 2 to about 10 weight percent of oxygenated compounds and up to about 20% by weight, based on the oxygenated compounds, of hydrocarbons.

9. A process as defined by claim 1 wherein said coal liquids are extracted with water at a temperature between about 100° and about 500° F.

10. A process as defined by claim 1 wherein said raffinate phase is fractionated to produce a hydrocarbon fraction containing constituents within the solvent boiling range and said fraction is hydrogenated in said hydrogenation zone.

11. A process as defined by claim 1 wherein said coal liquids are fractionated to produce a hydrocarbon stream boiling within the range between about 400° F. and about 850° F. and said hydrocarbon stream is extracted with said solvent in which oxygenated compounds are soluble.

12. A process as defined by claim 1 wherein said oxygenated compounds in said extract phase are recovered from said extract phase and thereafter gasified to produce said synthesis gas.

13. A process as defined by claim 4 wherein said hydrocarbon feed comprises liquefaction bottoms.

14. A process as defined by claim 1 wherein said oxygenated compounds are combined with oxygenated compounds recovered from wastewater and thereafter gasified to produce said synthesis gas.

15. A process as defined by claim 1 wherein said carbonaceous solids comprise coal and said hydrocarbon solvent is a hydrogen-donor solvent.

16. In a hydrogen-donor solvent coal liquefaction process wherein coal is liquefied at elevated temperature and pressure in a liquefaction zone in the presence of a hydrogen-donor solvent and added molecular hydrogen, liquid hydrocarbons in the hydrogen-donor solvent boiling range are recovered from the liquefaction zone effluent, and at least part of said liquid hydrocarbons are thereafter hydrogenated in a catalytic hydrogenation zone to produce hydrogen-donor solvent for recycle to the liquefaction zone, the improvement which comprises aqueous extraction of oxygenated compounds from said liquid hydrocarbons in the hydrogen-donor solvent boiling range to produce a raffinate phase containing said liquid hydrocarbons and an aqueous extract phase containing said oxygenated compounds, hydrogenating said raffinate phase in said hydrogenation zone, and gasifying said oxygenated compounds to produce a synthesis gas containing hydrogen and carbon monoxide.

17. A process as defined by claim 16 wherein said oxygenated compounds are gasified in the presence of steam and oxygen in a partial oxidation zone.

18. A process as defined by claim 16 wherein said oxygenated compounds are gasified in the presence of steam and a reforming catalyst in a catalytic reforming zone.

* * * * *